United States Patent [19]
Bedard

[11] 3,744,583
[45] July 10, 1973

[54] SNOW VEHICLE AND SUSPENSION SYSTEM THEREFOR

[76] Inventor: Eugene Bedard, P.O. Box 29, R.R. 4, Laurierville, Quebec, Canada

[22] Filed: Sept. 13, 1971

[21] Appl. No.: 179,779

[52] U.S. Cl. .................... 180/5 R, 305/24, 305/25
[51] Int. Cl. ........................................... B62m 27/02
[58] Field of Search ................... 180/5 R; 305/24, 305/25

[56] References Cited
UNITED STATES PATENTS

| | | | |
|---|---|---|---|
| 3,637,265 | 1/1972 | Valentine | 180/5 R |
| 3,684,043 | 8/1972 | Hirsch | 180/5 R |
| 3,658,392 | 4/1972 | Perreault | 305/24 |
| 3,658,145 | 4/1972 | Bergmann | 180/5 R |
| 3,613,811 | 10/1971 | Brandli | 180/5 R |

*Primary Examiner*—Richard J. Johnson
*Attorney*—Pierre Lesperance

[57] ABSTRACT

A snow vehicle having front steering skis and an endless track, more particularly a snowmobile, and a suspension system of the slide bar type which is entirely supported relative to the body of the vehicle by a single axle and which is provided with pivotally supported slide bars. A rigid frame is pivoted intermediate its ends on the single axle; said frame has second axles on which spring biased suspension arms are pivotally mounted in pairs and the slide bars are pivotally mounted on the lower end of the suspension arms towards engagement with the ground-engaging run of the track. The two slide bars are independently pivotally supported, but a releasable lock enables the user to obtain unitary movement thereof. The arrangement mounted on a single axle can also be modified to provide a single slide bar for use with a track having a single row of central sprocket engaging holes. Springs carried by the rear end of the frame, are engageable with the vehicle chassis to resiliently prevent dipping of the front ends of the slide bar and also to transfer the weight of the vehicle and passengers forwardly onto the skis for better steering. Shock absorbers are mounted between the slide bars and the frame for a smoother ride.

19 Claims, 23 Drawing Figures

PATENTED JUL 10 1973

INVENTOR
Eugène BEDARD
BY Pierre Lespérance
AGENT

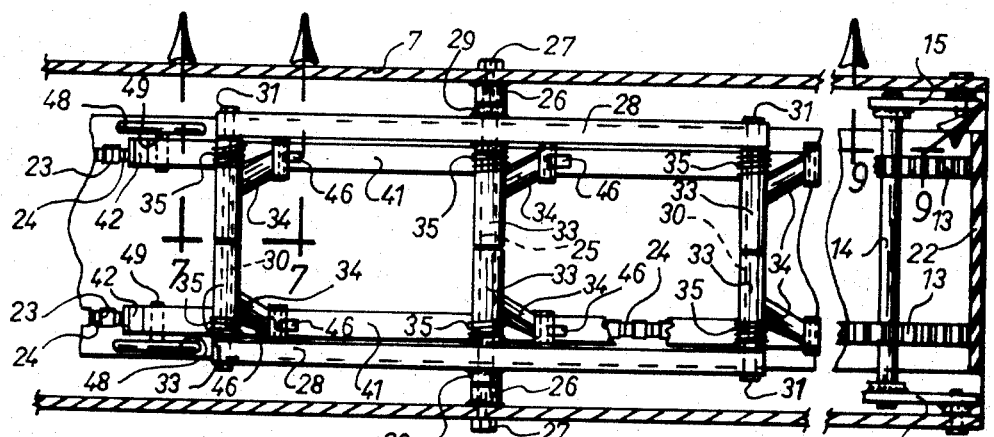
FIG.6
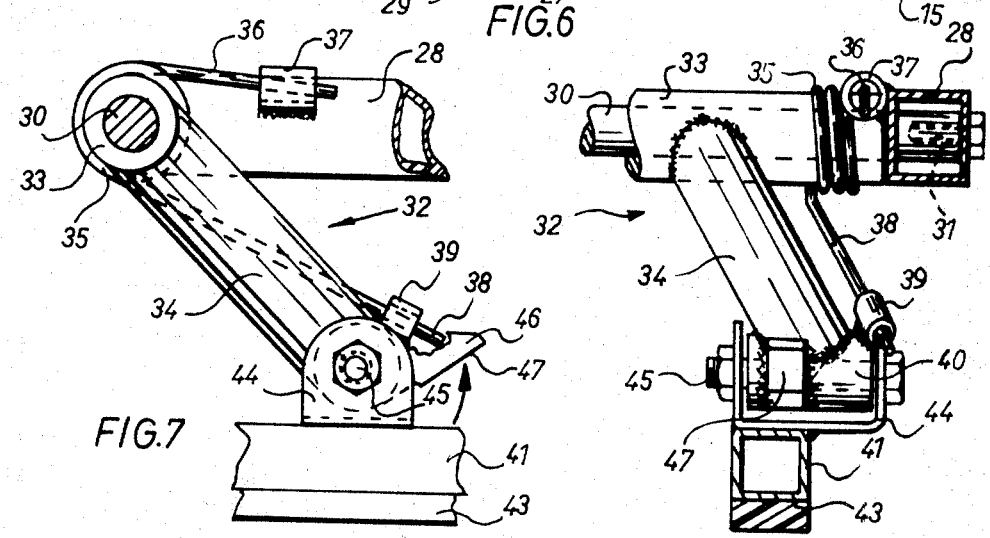
FIG.7
FIG.8
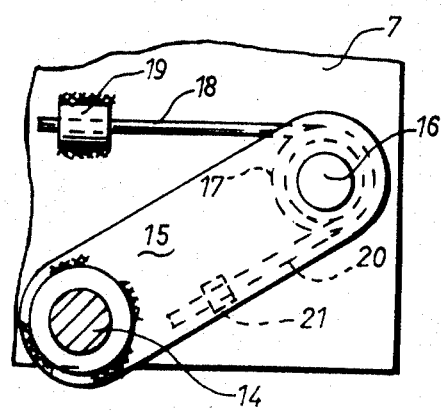
FIG.9
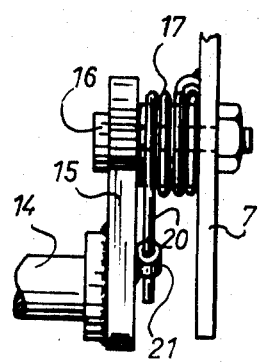
FIG.10
INVENTOR
Eugène BEDARD
BY Pierre Lesperance
AGENT

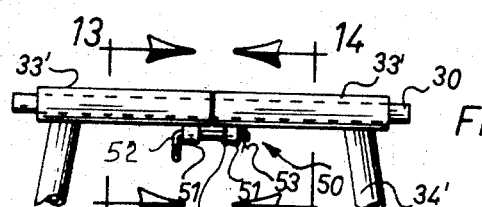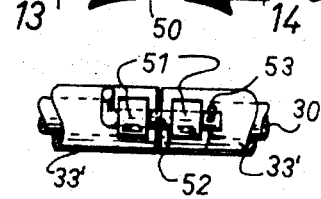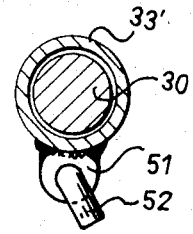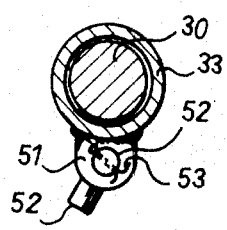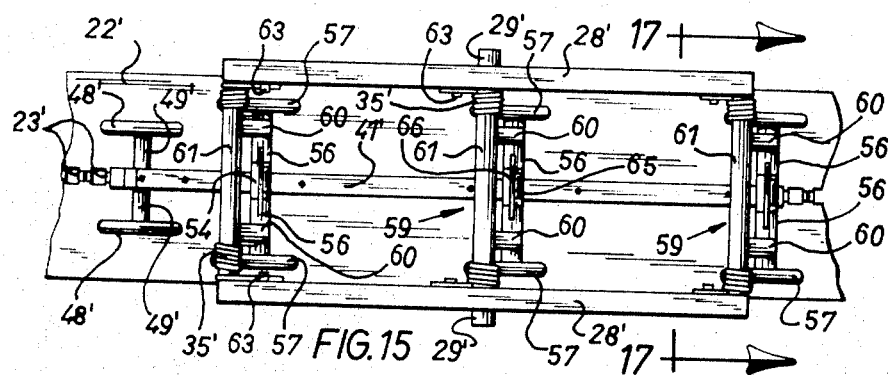

INVENTOR
Eugène BEDARD
BY Pierre Lespérance
AGENT

SNOW VEHICLE AND SUSPENSION SYSTEM THEREFOR

This invention relates to a snow vehicle and, more particularly, to a snowmobile having an endless track and to a suspension system of the slide bars type for such tracked vehicles.

Recently, a type of suspension system using slide bars biased against the ground-engaging run of an endless track has been conceived and put into use on snowmobiles. The known suspension systems of the slide bar type include a combination of many different parts, some of which being expensive to produce.

The main object of the invention is to produce a suspension system for a snow vehicle which suspension system is made of relatively few and simple parts while allowing greater speed of the vehicle, because of the improved traction on snow and of a smoother ride; the suspension system also produces forward transfer of the load for better steering.

It is another important object of the invention to provide a suspension system of the slide bar type wherein the slide bars are independently pivoted relative to each other and yet can be releasably locked for simultaneous up-and-down movement.

It is a further object of the invention to provide a suspension system which is entirely supported relative to the body of the snow vehicle by a single axle and having a frame pivoted intermediate its ends on said single axle and supporting slide bars movable up and down independently or not of each other.

Another object of the invention is to provide a suspension system of the slide bar type wherein each slide bar is pivotally supported at the free lower ends of a number of spring biased suspension arms which are mounted along the corresponding side of the vehicle and arranged to allow pivoting, up and down and rearward displacement of each slide bar.

Another object of the invention is to provide a modified suspension system having a single central slide bar for use with a track having a single row of sprocket tooth receiving holes.

Preferred embodiments of the invention will now be described in detail, by way of example only, with reference to the accompanying drawings, in which:

FIG. 6 is a plan sectional view as seen along line 6—6 in FIG. 1;

FIG. 7 is a sectional view as seen along line 7—7 in FIG. 6 and showing a spring-biased suspension arm;

FIG. 8 is an elevation view, partly in cross-section, as seen from the right in FIG. 7;

FIG. 9 is a partial elevation, partly in cross-section, as seen along line 9—9 in FIG. 6;

FIG. 10 is an elevation view as seen from the right in FIG. 9;

FIG. 11 is a partial elevation of a modified embodiment of the suspension system showing means for interlocking the two slide bars for simultaneous movement;

FIG. 12 is a partial bottom view of FIG. 11;

Figure 19:
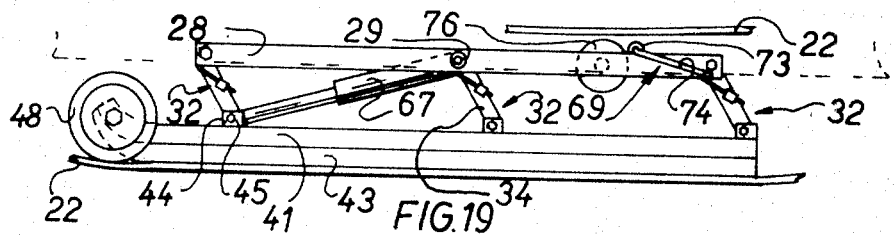
Figure 20:
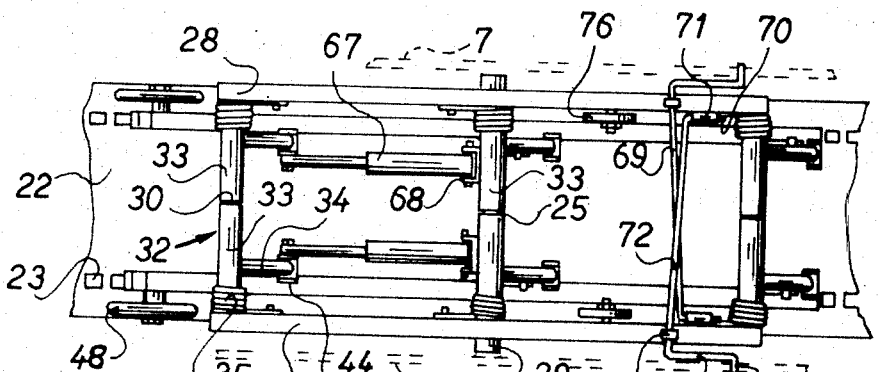
Figure 21:
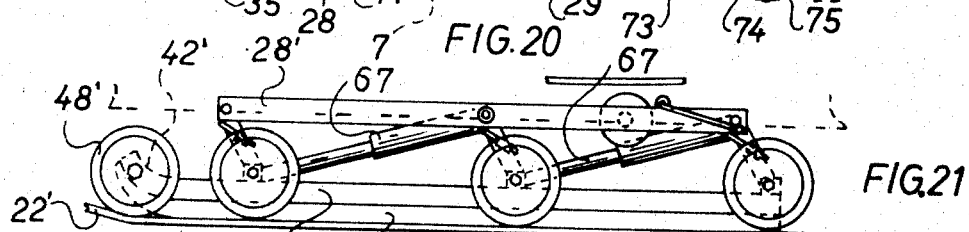
Figure 22:
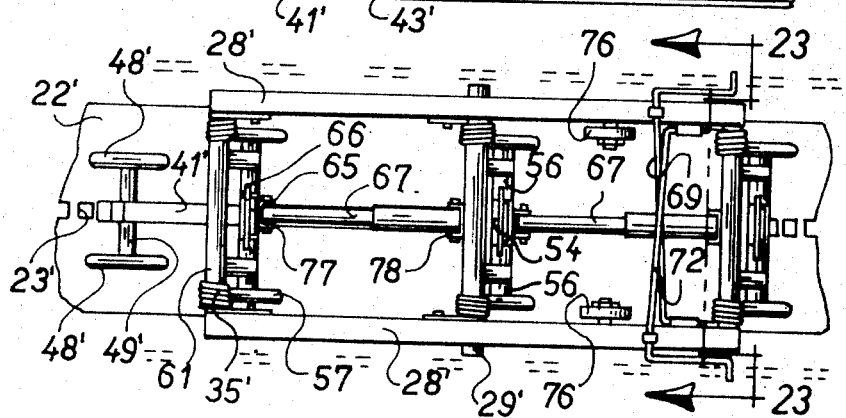

FIGS. 13 and 14 are cross-sections along lines 13—13 and 14—14 of FIG. 11;

FIG. 15 is a top plan view of another embodiment of the suspension system with a single slide bar;

FIG. 16 is a side elevation of the embodiment of FIG. 15;

FIG. 17 is a partial cross-section along line 17—17 of FIG. 15;

FIG. 18 is a partial perspective view of the slide bar and its pivotal connection showing the motion limiting abutments;

FIG. 19 is a side elevation of yet another embodiment of the suspension system with two slide bars;

FIG. 20 is a top plan view of the embodiment of FIG. 19;

FIG. 21 is a side elevation of still another embodiment similar to FIG. 19 but with a single slide bar;

FIG. 22 is a top plan view of the embodiment of FIG. 21; and

Figure 23:
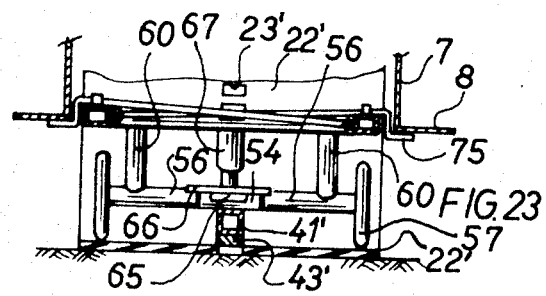

FIG. 23 is a cross-section on line 23—23 of FIG. 22.

The snowmobile for which the suspension system is intended to be used includes a ski 2 fixed to a spring suspension 3 supported at the lower end of a shaft 4 connected, in any known manner, to the handle bar 5 to be steered by the latter. The rear end of the snowmobile 1 has a body portion made of sheet metal forming a seat supporting plate 6, a side plate 7 on each side of the snowmobile and a foot-board 8. A shaft 9 extends transversely under the snowmobile and is rotatably mounted at its opposite ends on the side plates 7. A pair of driven sprockets 10 and a drive sprocket 11 are fixed onto the shaft 9 for rotation therewith. A chain 12 engages the drive sprocket 11 and a motor, not known, to rotate the shaft 9 and the driven sprockets 10. The motor is located in the front portion of the vehicle, in known manner. A pair of idler wheels 13 are fixed on a transverse shaft 14 mounted on the free end of a pair of track tension adjusting arms 15 and are rotatably mounted by pivots 16 on the inner sides of the side plates 7. As best shown in FIGS. 9 and 10, a helical spring 17 is inserted around each pivot 16 with one end 18 of each spring 17 fixed into a lug 19 provided on the inner surface of the adjacent side plate 7 and another end 20 engaged in another lug 21 fixed on the associated track tension adjusting arm 15, such as to bias the free end thereof and the idler wheels 13 rearwardly to automatically maintain the tension in the endless track 22. The latter is provided with sprocket tooth apertures 23 along both longitudinal edges thereof and wear clips 24 fixed intermediate the sprocket tooth apertures 23 to reduce wear of the endless track between the apertures.

It will be noted that the endless track 22, which has been described, is of known construction but could as well be of other construction without affecting the principle of the invention which resides in the suspension system which will now be described in relation with the abovedescribed parts of a snowmobile.

The suspension system comprises a first axle 25 extending transversely of the snowmobile 1 and journalled into a pair of sleeves 26 welded, or otherwise secured, on the inner surface of the side panels 7 in axial alignment with each other. A screw 27 is screwed into each end of the first axle 25 to rigidly secure the latter and the side panels 7 one to another. A pair of beams 28, for example of square cross-section as illustrated in FIG. 8, are each provided intermediate their ends with a sleeve 29 secured rigidly thereto for rotation therewith. The sleeves 29 are inserted onto the first axle 25 for pivotal movement of the beams 28 about the first axle 25 in parallel positions relative to each other along the sides of the snowmobile.

It will be understood, as the description proceeds, that only one beam could be used instead of two, the single beam being preferably mounted on the first axle 25 at equal distances from the side plates 7 of the snowmobile.

A pair of second axles 30 join the free ends of the beams 28 and extend parallel to the first axle 25, thereby defining a pivoted rectangular frame with the beams 28. Obviously, this frame may be other than rectangular. For instance, the beams 28 could be curved longitudinally, could form an X-shape in plan view or, as mentioned above, could be replaced by a single beam. Screws 31 are threaded into the ends of the second axles 30 to secure the latter to the beams 28.

A pair of suspension arms 32 is pivotally mounted on each of the first and second axles 25 and 30 for independent pivoting movement of one relative to the other. Each suspension arm 32 comprises a sleeve portion 33 inserted around one of the axles 25 and 30 and a tubular arm portion 34 fixed at one end against an associated sleeve portion 33 with the free end of the arm portion 34 pointing away from the sleeve portion 33. A helical spring 35 is inserted around the outer end of each sleeve portion 33 with one end 36 thereof inserted into a lug 37 provided on the inner side of the adjacent beam 28 and the other end 38 inserted into a lug 39 provided on the corresponding arm portion 34. Another sleeve portion 40 is fixed to the free end of each arm portion 34, parallel to the associated sleeve portion 33.

A pair of slide bars 41 having an upwardly curved front end portion 42 is provided along each side of and overlying each lateral edge of the ground-engaging run of the endless track 22. The slide bar 41 is preferably provided with a wear pad 43, of any suitable wear-resistant material, such as low friction polyester resins. The wear pad 43 is secured against the undersurface of the slide bar 41 and arranged to rest on the metallic wear clips 24 to minimize friction between and wear of the slide bars 41 and of the endless track 22. U-shape brackets 44 are fixed onto the slide bars 41 at spaced-apart positions lengthwise thereof and are arranged to receive the transversely extending sleeve portions 40 between the upwardly directed portions thereof. Transverse pins or bolts 45 secure the sleeve portions 40 to the same number of U-shape brackets 44 to allow pivoting of each arm portion 34 relative to the associated slide bar 41.

It must be noted that, since the suspension arms 32 on one side of the snow vehicle are independently pivoted relative to the other suspension arms 33 on the other side of the vehicle, and that each slide bar 41 is connected to the suspension arms 32 on the corresponding side only of the vehicle, there results that each slide bar is independent of the other. It must also be noted that the arm portions 34 are all oriented towards the rear of the vehicle relative to their supporting axles, such as to allow rearward displacement of the slide bars and to bias the same downwardly against the ground-engaging run of the endless track.

As best illustrated in FIGS. 7 and 8, a piece of metal 46 is welded or otherwise secured to the lower or free end of preferably each arm portion 34, to form an abutment surface 47 arranged to engage the top surface of the slide bars 41 when there is no passenger on the snowmobile.

Figure 1:
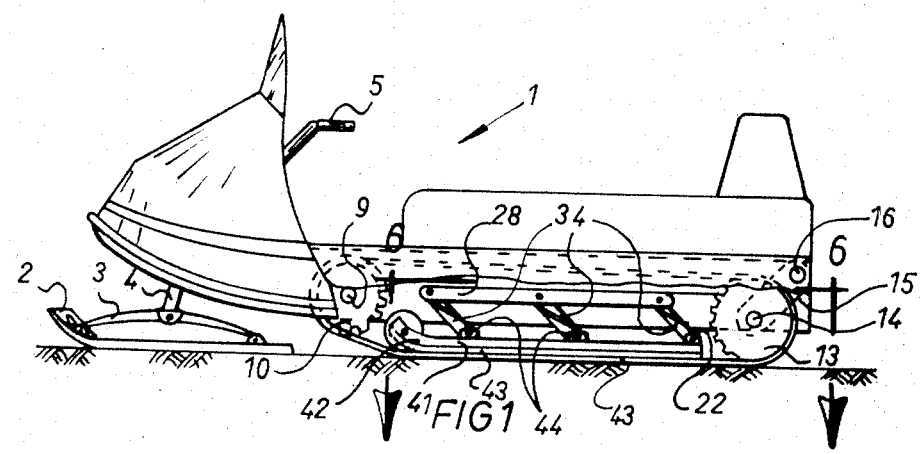
FIG. 1 is a side elevation view of a snowmobile, partly broken away, to show a suspension system according to the invention.
Figure 2:
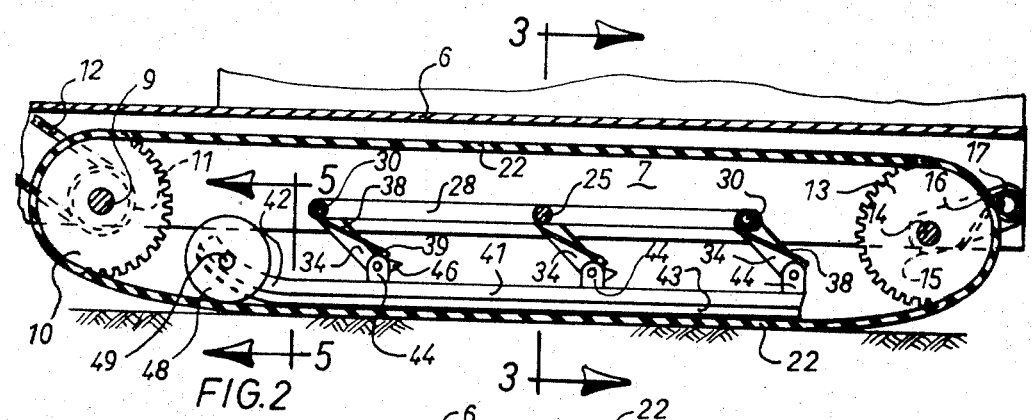
FIG. 2 is a sectional view taken longitudinally of the snowmobile of FIG. 1 and showing the suspension system in elevation.
Figure 3:
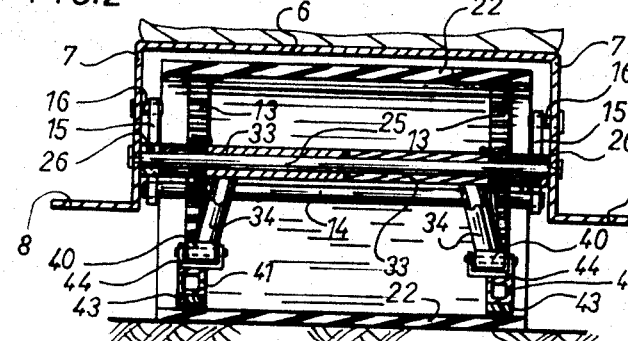
FIG. 3 is a cross-sectional view as seen along line 3—3 in FIG. 2.

It will be noted, when looking at the side views of FIGS. 1 and 2, that the beams 28, the arm portions 34 and the slide bars 41 form a parallelogram suspension on each side of the vehicle, whereby the slide bars 41 will have no pivoting movement relative to the beams 28. The pivoting movement will be transmitted to the beams 28 and will be assumed by the latter about the axle 25 in a bogie-like manner.

A wheel 48 is rotatably mounted by a stub shaft 49 on the curved front end 42 of each slide bar 41 to ease passage of track 22 over the front ends of the wear pads 43 of slide bars 41.

Referring to FIG. 2, it will be noted that endless track 22 is maintained under tension between the sprockets 10 and the idler wheels 13, the latter serving as track tightener under the action of springs 17.

The suspension system is encompassed by the track 22, but this system which comprises the beams 28, suspension arms 32 and slide bars 41, is free to rotate about transverse axle 25, this pivotal movement being, however, limited by the encompassing track 22. Thus, the front ends 42 of the slide bars 41 are free to move upwardly upon encountering an obstacle; but this upward movement is limited by the track 42 resiliently resisting the downward movement of the rear ends of the slide bars. Inversely, the rear ends of the slide bars may pivot upwardly up to a point limited by the resistance of track 22 to the downward movement of front ends 42 of the slide bars 41.

Because the suspension system is free to pivot about axle 25, the track 22 conforms very well to the ground ondulations or irregularities, resulting in improved traction over snow and, consequently, greater speed of the vehicle over vehicles of the same power and weight equipped with conventional suspensions. Transversely uneven ground with respect to the direction of movement of the vehicle can be negotiated very smoothly, because the two slide bars 41 can move up and down independently of each other.

However, depending on the user's desire and on the type of terrain being nogotiated by the vehicle, provision is made to lock the two sides of the suspension system, so they will work simultaneously. FIGS. 11 to 14 show a modification providing such interlocking of the two sides of suspension system. In accordance with this modified embodiment, each pair of axially aligned sleeve portions 33 can be removably interlocked against relative rotation by means of a locking device, generally indicated at 50 and comprising a pair of short tubes 51 respectively secured to the underside of the two adjacent ends of the sleeve portions 33' and adapted to removably receive an L-shaped locking pin 52, which is positively maintained in position by means of a cotter pin 53 extending through a transverse end hole of the locking pin 52. Thus, when each of the three pairs of sleeve portions 33' is interlocked by locking pins 52, the suspension arms 34', on each side of the vehicle, will pivot simultaneously and, therefore, the slide bars 41 of the modified system will move up and down simultaneously against the action of the springs 35. Thus, a more rigid suspension action is obtained.

A suspension system in accordance with the same principle can be provided for snowmobiles having a track of the type provided with a single longitudinally disposed row of sprocket receiving apertures located along the center line of the track and driven by a single sprocket wheel. Such a system is shown in FIGS. 15 to 18 inclusive.

FIG. 15 shows the endless rubber track 22' provided with a single row of centrally disposed longitudinally extending sprocket tooth receiving apertures 23', the edges of which are lined with wear clips 24'. A single sprocket wheel 10', shown in dotted lines, engages the tooth receiving apertures 23 to drive the track 22' and the track is maintained in taut condition by means of the tightening idling wheels 13', which may be two or more in number.

The modified suspension system comprises a single slide bar 41', similar to slide bars 41, but centrally disposed longitudinally of the vehicle in vertical alignment with the apertures 23' and provided with a wear pad 43' in sliding engagement with the wear clips 24'. The front upwardly curved end 42' of the slide bar 41' carries oppositely disposed stub shafts 49' transversely aligned and on which are mounted idler wheels 48' to ease passage of the track over wear pad 43'.

Three transverse sleeves 54 are secured to the top of slide bar 41' and are preferably equally spaced. Each sleeve 54 receives a rod 55 which extends through axially aligned sleeve portions 56 on each side of the sleeve 54.

Track-engaging wheels 57 are rotatably mounted for free rotation on the outer ends of sleeve portion 56 and are retained thereon by rod 55 and nuts 58 screwed on the latter.

Figures 4, 5:
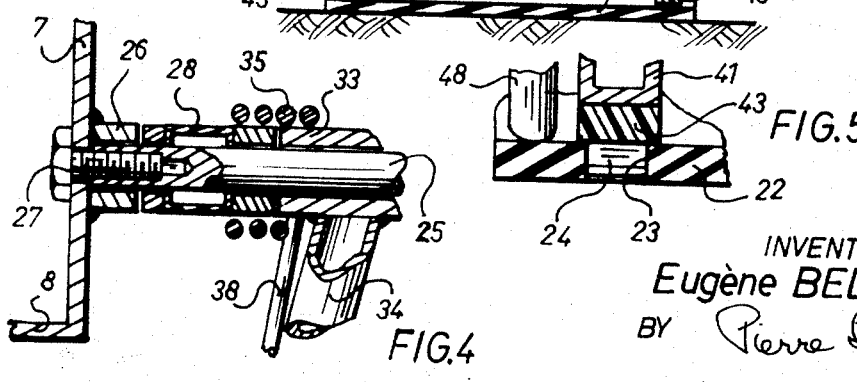
FIG. 4 is an enlarged cross-sectional view of part of FIG. 3 showing a suspension arm and axle arrangement.
FIG. 5 is an enlarged partial cross-sectional view as seen along line 5—5 in FIG. 3.

The two sleeve portions 56 are part of a suspension assembly 59 comprising the two suspension arms 60, each secured to a respective sleeve portion 56, and to a common main sleeve 61. The three main sleeves 61 extend transversely completely between the pair of longitudinally extending parallel beams 28', similar to the beams 28 of the first embodiment. The main sleeves 61 are substantially equally spaced and are each pivotally mounted on an axle 62 secured to the beams 28'. Sleeve portions 29' are secured to the outside of the respective beams 28' in alignment with the central main sleeve 61 and are provided with inner threads for receiving a bolt, such as bolt 27 (see FIG. 4) for pivoting the suspension assembly to the side plates 7 of the snowmobile, as in the first embodiment.

The two ends of each main sleeve 61 are surrounded by a helical coil spring 35' having one end secured to the respective beams 28', as shown at 63, while the other end is secured to the respective suspension arms 60, as shown at 64. The helical springs 35' urge the arms 60 in clockwise rotation, looking at FIG. 16. This clockwise rotation is limited by abutment surfaces provided by a stop 65 secured to the slide bar sleeve 54 and a stop rod 66 secured to the two aligned sleeve portions 56 and freely overlying the slide bar sleeve 54, as shown in FIG. 18.

The lowest part of idle wheels 48' and 57 are substantially in the plane of underface of wear pad 43' and serve to maintain the ground-engaging run of track 22' in substantially transversely flat condition. As in the first embodiment, the suspension unit is completely encompassed by the endless track 22' and may pivot as a body about the central transverse pivotal axis defined by central main sleeve 61 and sleeve portions 29'. Also, the slide bars may move up and down with respect to the beams 28' against the action of the helical springs 35'. When the vehicle has no load, the arms 60 take a limit position by intercontact between abutment rods 65, 66.

In the first two embodiments, the arms 34, 34' have been shown as downwardly divergent but could be parallel, as shown by arms 60 of the third embodiment, provided the wear pads 43 are made to bear on the wear clips 24 of the track 22.

FIGS. 19 and 20 show yet another embodiment of the invention in which the suspension system is provided with shock absorbers for a smooth ride and with spring means to prevent vehicle tilting and transfer the weight of the vehicle unto the front steering skis. The embodiment of FIGS. 19 and 20 is designed for a snowmobile having an endless rubber track 22 provided with two spaced parallel longitudinally extending rows of sprocket tooth receiving apertures 23, the edges of which are lined with wear clips as in the first embodiment. Sprocket wheels 19, as shown in the first embodiment, engage the tooth receiving apertures 23 to drive the track 22 and the track is maintained in taut condition by means of tightening idling wheels 13, as in the first embodiment.

A pair of longitudinal beams 28 are each provided intermediate their ends with a sleeve 29 secured thereto. The sleeves 29 receive a first axle, such as axle 25 of the first embodiment, which is secured to the side plates 7 of the vehicle by means of bolts 27. Second transverse axles 30 join the ends of the beams 28. A pair of slide bars 41, with their wear pads 43, are pivotally connected to the axles 25 and 30 by means of three pairs of independently pivoted suspension arm assemblies 32, each including a sleeve portion 33 rotatably surrounding the respective axles 25 and 30, and a downwardly rearwardly inclined arm 34 pivoted at its lower end to a U-bracket 44 secured to the slide bar 41.

Each sleeve 33 is surrounded by a helical spring 35 attached to the beam 28 at one end and to the arm 34 at the other end and urging the slide bars 41 away from beams 28. The front curved end portions 42 of the slide bars carry track-engaging idle wheels 48.

In accordance with a feature of this embodiment, shock absorbers 67 are associated with each slide bar 41. Each shock absorber is pivotally connected at one end to the pivot joining the arm 34 to the front U-shaped bracket 44, and at the other end to a bracket 68 secured to the sleeve 33 surrounding the first central axle 25.

In accordance with another feature, there are provided weight transferring spring means which comprise a pair of torsion bars 69 carried by the rear end portions of the beams 28 and adapted to engage the underside of the foot-boards 8 (see FIG. 23) to resiliently urge the rear end portion of the seat supporting plate 6 outwardly and thus transfer the weight onto the front steering skis of the snowmobile. Each torsion bar 69 is generally U shape with one short leg 70 secured to one beam 28 by means of a lug 71 with the bight portions 72 extending transversely of the beams 28 to be rotatably mounted in an eye 73 secured to the opposite beam 28. The other longer leg 74 of the torsion bar extends rearwardly from eye 73 and is outwardly bent to form a lateral outward extension 75 bearing against the underface of the foot-board 8, as shown in FIG. 23. The two torsion bars 69 are oppositely arranged, each bar being secured to one associated beam 28 and rotatably mounted on the opposite beam. Their bight portions 72 cross each other between the two beams 28. These torsion bars are stressed so that ends 75 will exert an upward force on the foot-board 8 to thus transfer the weight of the rear portion of the snowmobile onto the front steering skis for better steering. These torsion bars also prevent undue tilting of the snowmobile.

The sleeves 33 on each axle 25 or 30 are preferably provided with an interlocking device, such as device 50 of FIGS. 11 to 13, to rotate the sleeves independently of each other or as a unit, as previously described.

The rear portions of the beams 28 carry idle wheels 76 for engaging the top run of the track 22 when the suspension assembly pivots about the central axle 25.

It will be noted that the torsion bars 69 progressively resist anticlockwise pivoting of the suspension assembly about the central axle 25.

The same system as above described can be incorporated in a snowmobile having a track of the type provided with a single longitudinally disposed row of sprocket receiving apertures located along the centerline of the track and driven by a single sprocket wheel, as shown in FIGS. 21 to 23, said embodiment corresponding to the embodiment of FIGS. 15 to 18 inclusive.

The track 22' has a single row of sprocket tooth receiving apertures 23' and the suspension system has a single centrally disposed longitudinally extending slide bar 41' with its wear pad 43' running over the wear clips surrounding the apertures 23'.

The front curved end 42' carries stub shafts 49' mounting idler wheels 48'. Three transverse sleeves 54 are secured to slide bar 41' and each receives a rod, such as rod 55, which extends through aligned sleeve portions 56 secured to suspension arms 60, each secured to a common main sleeve 61. Track-engaging idle wheels 57 are mounted on the outer ends of sleeve portions 56. The main sleeves 61 are rotatable about transverse axles secured to the longitudinally extending beams 28'. The latter are provided at their center with sleeves 29' for pivotal connection of the beams to the side plates 7 of the snowmobile chassis.

Torsion springs 35' surrounding the ends of the main sleeves 61 urge the slide bar 41' against the track bottom run. This downward movement is limited by the stop assembly 65, 66.

As in the embodiment of FIGS. 19 and 20, the suspension system is provided with shock absorbers 67, torsion bars 69 and idle wheels 76 with the only difference that the shock absorbers are centrally located and are associated with two longitudinally spaced suspension arms. More particularly, each shock absorber is pivotally connected at one end to the sleeve 54 by a bracket 77, and at the other end to a central bracket 78 secured to the main sleeve 61 of the next suspension arm assembly.

I claim:

1. A suspension system for a snow vehicle having a body and an endless track with a ground-engageable run, said suspension system comprising a first pivot means defining a first pivot axis and arranged to be fixed to said body above said ground-engageable track run, beam means mounted intermediate its ends on said first pivot axis extending transversely thereof, a pair of second pivot means mounted onto said ends of said beam means and defining second pivot axis extending transversely of said beam means, suspension arms pivoted on at least each of said second pivot means, each of said suspension arms having an arm portion extending transversely of said pivot means, spring means connected between said beam means and each suspension arm and arranged to bias the transversely extending arm portion thereof away from said beam means, and at least one slide bar extending along said beam means and pivotally mounted onto the free end of said transversely extending arm portion, such as to be biased away from said beam means by said spring means.

2. A suspension system for a snow vehicle as defined in claim 1, wherein said beam means comprises a pair of spaced-apart beams, both pivotally mounted about said first pivot axis, and said second pivot means are rods respectively joining one end of one beam to one end of the other beam and extending along said first pivot axis on opposite sides thereof.

3. A suspension system as defined in claim 2, wherein said pair of beams and said pair of rods form a rectangular frame extending lengthwise of and overlying said ground-engageable track run.

4. A suspension system as defined in claim 2, wherein said rods and said first pivot means are axles, each of said suspension arms comprises a sleeve portion rotatably mounted on one of said axles and said arm portions fixed at one end to said sleeve portion and extending away therefrom, and each of said spring means is a coil spring inserted around said sleeve portion with one end of each coil spring fixed to one arm portion and arranged such as to bias the latter away from said beams.

5. A suspension system as defined in claim 4, wherein there are two spaced parallel slide bars and two suspension arms on each of said axles, one suspension arm is mounted adjacent one of said beams and is pivotally connected to the same one of said slide bars and the other suspension arm on each of said axles is mounted adjacent the other of said beams and is pivotally connected to the other slide bar, the sleeve portions being mounted end to end on the respective axles for independent rotary movement.

6. A suspension system as defined in claim 5, further including a manual locking means for releasably interlocking the pairs of suspension arms on at least one of said axles for rotary movement in unison.

7. A suspension system as defined in claim 6, wherein said locking means include aligned tubes secured to the sleeve portions mounted on the same axle and a locking removably insertable into the aligned tubes.

8. A suspension system as defined in claim 1, wherein there is a single slide bar arranged to engage the central zone of the ground-engageable run of the track, first sleeves secured to said slide bar transversely thereof, second sleeves secured to the lower ends of said arm portions and in alignment with said first sleeve, an axle rod pivotally interconnecting said first and second sleeves and idler wheels rotatably mounted on the ends of said second sleeves and adapted to engage said ground-engageable track run.

9. A suspension system as defined in claim 1, wherein said slide bar is provided with a wear-resistant strip constructed and arranged to engage said ground-engageable run of said endless track and at least one wheel is rotatably mounted at one end of said slide bar to engage the ground-engageable run of the endless track.

10. A snow vehicle comprising a body, an endless track rotatably mounted under said body and having a ground-engageable run extending in fore and aft direction relative to said snow vehicle, said track having at least one longitudinal row of tooth receiving apertures, a sprocket wheel carried by said body and engageable with said tooth apertures to drive said track, a spring biased idler wheel engageable with the other end of said track to maintain the same in taut condition and a suspension system encompassed by said track, comprising a frame of elongated shape extending longitudinally of said body and pivotally mounted intermediate the ends of said frame about an axis transverse to said body, a rigid slide bar with a wear pad extending longitudinally of said body under said frame and engaging with said ground-engageable run of said endless track and spring biased suspension arms pivoted on said frame at longitudinal spaced zones thereof and pivotally connected to said slide bar at longitudinally spaced zones thereof, said spring biased suspension arms urging said slide bar away from said frame, the assembly of said frame, slide bar and suspension arms being freely rotatable about said transverse axis relative to said vehicle body.

11. A snow vehicle comprising a body, an endless track rotatably mounted under said body and having a ground-engageable run extending in fore and aft direction relative to said snow vehicle, a first axle fixed to said body and defining a first pivot axis extending transversely of said ground-engageable run, a pair of parallel beams pivotally mounted intermediate their ends on said first axle and extending in said fore and aft direction for pivotal movement about said first pivot axis, a pair of second axles respectively joining one end of one of said beams to one end of the other beam and arranged parallel to said first axle on opposite sides thereof, a pair of suspension arms independently pivoted relative to each other on each of said pivot axles, each of said suspension arms having an arm portion and a sleeve portion, said sleeve portions are rotatably mounted on said axles and said arm portions are secured at one end to said sleeve portions and extend away therefrom transversely of said axles, a coil spring inserted around each of said sleeve portions with one end of said coil spring fixed to one arm portion and arranged to bias the latter away from said beams towards the ground-engageable run, a pair of slide bars extending along said pair of beams on each side of and overlying said ground-engageable run over the lateral edges thereof, one suspension arm on each of said axles is mounted adjacent one of said beams and the other suspension arms on said axles are mounted adjacent the other of said beams, the suspension arms mounted adjacent said one beam are pivotally connected to one of said slide bars and the other suspension arms mounted adjacent said other beam are pivotally connected to the other slide bar onto the free end of said arm portions, and said slide bars are constructed and arranged to engage the top surface of said ground-engageable run to resiliently bias the latter downwardly for engagement with the ground when the snow vehicle is in operative position.

12. A snow vehicle as defined in claim 6, wherein each arm portion is arranged for pivotal motion at the rear of the axis thereof, whereby to allow a rearward displacement of the slide bars upon compression of the associated coil spring.

13. A snow vehicle as defined in claim 7, wherein the end of each arm portion which is connected to a slide bar, is provided with an abutment surface arranged to engage the same slide bar when the snow vehicle carries no passenger.

14. A snow vehicle as claimed in claim 11, further including a manual locking means for releasably interlocking the pairs of suspension arms on each of said axles for rotary movement of said suspension arms in unison.

15. A snow vehicle as claimed in claim 10, wherein said slide bar is disposed vertically opposite said row of tooth receiving apertures and said tooth receiving apertures are lined with metal clips in direct contact with said wear pad.

16. A snow vehicle as claimed in claim 15, wherein there is a single slide bar engaging the central longitudinal zone of the ground-engaging run of the track, and said track has a single centrally located row of tooth receiving apertures and wear clips therefor.

17. A suspension system as defined in claim 1, further including additional spring means bearing against said body and against one end portion of said beam means and arranged to bias said beam means end portion away from said body.

18. A suspension system as claimed in claim 17, wherein said beam means comprises a pair of spaced-apart beams, both pivotally mounted about said first pivot axis and said additional spring means include a pair of torsion bars extending transversely across one end of said spaced-apart means, secured at one end to the respective beams, rotatably carried near their opposite end to the opposite respective beams and having a portion extending longitudinally of the respective beams adjacent their pivotal connection to the associated beams and with a lateral outward extension adapted to bear against the underside of said body.

19. A suspension system as claimed in claim 17, further including shock absorber means mounted between said beam means and said slide bar.

* * * * *